(12) United States Patent
Park et al.

(10) Patent No.: US 10,308,529 B2
(45) Date of Patent: Jun. 4, 2019

(54) DESALINATION APPARATUS AND DESALINATION METHOD USING SAME

(71) Applicant: Korea Electric Power Corporation, Naju-si, Jeollanam-do (KR)

(72) Inventors: Pill Yang Park, Daejeon (KR); Jae Bong Lee, Daejeon (KR); Seok Won Yoon, Daejeon (KR); Ki Hyoung Kim, Daejeon (KR); Kyu Il Kim, Seoul (KR)

(73) Assignee: Korea Electric Power Corporation, Jeollanam-do (KR)

( * ) Notice: Subject to any disclaimer, the term of this patent is extended or adjusted under 35 U.S.C. 154(b) by 30 days.

(21) Appl. No.: 15/568,720

(22) PCT Filed: Jun. 23, 2016

(86) PCT No.: PCT/KR2016/006721
§ 371 (c)(1),
(2) Date: Oct. 23, 2017

(87) PCT Pub. No.: WO2017/043741
PCT Pub. Date: Mar. 16, 2017

(65) Prior Publication Data
US 2018/0162753 A1   Jun. 14, 2018

(30) Foreign Application Priority Data

Sep. 8, 2015 (KR) .................. 10-2015-0127002

(51) Int. Cl.
*B01D 61/44* (2006.01)
*C02F 1/469* (2006.01)
(Continued)

(52) U.S. Cl.
CPC ............ *C02F 1/4693* (2013.01); *B01D 61/42* (2013.01); *B01D 61/58* (2013.01); *C02F 1/44* (2013.01);
(Continued)

(58) Field of Classification Search
CPC ...... C02F 1/4693; C02F 1/4691; C02F 1/445; C02F 9/00; C02F 1/001; C02F 2209/10;
(Continued)

(56) References Cited

U.S. PATENT DOCUMENTS

2006/0011544 A1\* 1/2006 Sharma ............... B01D 61/002
210/640

FOREIGN PATENT DOCUMENTS

JP    2002-346561 A    12/2002
JP    2015-029931 A    2/2015
(Continued)

OTHER PUBLICATIONS

International Search Report dated Nov. 18, 2016 issued in International Patent Application No. PCT/KR2016/006721 (English translation).

*Primary Examiner* — Arun S Phasge
(74) *Attorney, Agent, or Firm* — Morgan, Lewis & Bockius LLP

(57) ABSTRACT

The present invention relates to a desalination apparatus and a desalination method using the same. In one specific embodiment, the desalination apparatus comprises: a forward osmosis unit having a draw-solution part into which seawater flows, and a raw water part into which raw water flows, and having an osmosis membrane, formed between the draw solution part and the raw water part, so as to respectively generate first treated water and first concentrated water; a capacitive deionization unit, which is connected to the draw solution part through a first inflow passage, and into which the first treated water of the draw solution part flows so as to generate second treated water; and an electrodialysis unit, which is connected to the raw water part through a second inflow passage, and into which
(Continued)

the first concentrated water of the raw water part flows so as to generate third treated water.

14 Claims, 1 Drawing Sheet

(51) Int. Cl.
| | |
|---|---|
| *B01D 61/42* | (2006.01) |
| *C02F 1/44* | (2006.01) |
| *C02F 9/00* | (2006.01) |
| *B01D 61/58* | (2006.01) |
| *C02F 1/00* | (2006.01) |
| *C02F 103/08* | (2006.01) |
| *B01D 61/00* | (2006.01) |

(52) U.S. Cl.
 CPC ............ *C02F 1/445* (2013.01); *C02F 1/4691* (2013.01); *C02F 9/00* (2013.01); *B01D 61/002* (2013.01); *B01D 61/422* (2013.01); *B01D 2311/24* (2013.01); *B01D 2313/50* (2013.01); *B01D 2313/90* (2013.01); *C02F 1/001* (2013.01); *C02F 2103/08* (2013.01); *C02F 2209/005* (2013.01); *C02F 2209/10* (2013.01); *C02F 2209/40* (2013.01); *Y02A 20/131* (2018.01); *Y02A 20/134* (2018.01)

(58) Field of Classification Search
 CPC ... C02F 2103/08; B01D 61/58; B01D 61/422; B01D 61/002; B01D 2311/24; B01D 2313/50
 See application file for complete search history.

(56) References Cited

FOREIGN PATENT DOCUMENTS

| | | |
|---|---|---|
| KR | 10-2013-0074104 A | 7/2013 |
| KR | 10-1389450 B1 | 4/2014 |
| KR | 10-2014-0073312 A | 6/2014 |
| KR | 10-1448017 B1 | 10/2014 |

* cited by examiner

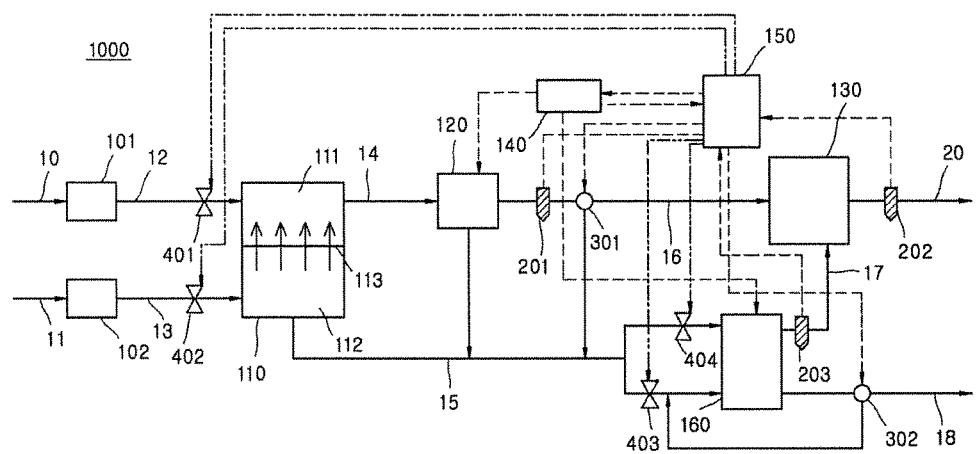

DESALINATION APPARATUS AND DESALINATION METHOD USING SAME

CROSS REFERENCE

This patent application is the U.S. National Phase under 35 U.S.C. § 371 of International Application No. PCT/KR2016/006721, filed on Jun. 23, 2016, which claims the benefit of Korean Patent Application No. 10-2015-0127002, filed on Sep. 8, 2015, the entire contents of each are hereby incorporated by reference.

TECHNICAL FIELD

The present invention relates to a desalination apparatus and a desalination method using the same, and more specifically, to a desalination apparatus capable of providing an effect of reducing a pretreatment cost and energy consumption, having an excellent fresh water production and recovery rate, and easily producing fresh water having a desirable water quality.

BACKGROUND ART

Recently, due to climate change caused by global warming and water contamination and environmental pollution caused by population growth and industrialization, there is a problem of water shortages increasing around the world. To solve the above water shortage problem, a variety of previous desalination technologies have been developed and used, and currently, a technology for reducing costs for producing fresh water is being actively developed.

Generally, sea water may have a total dissolved solids (TDS) concentration of 20,000 ppm to 50,000 ppm (mg/l). The TDS include a variety of monovalent, divalent and other multivalent salts or chemical species, and among them, sodium chloride accounts for 75 wt % of the total solids. Meanwhile, generally, drinking water has a TDS concentration of 500 ppm or less.

Conventional technologies of desalinating salt water may be classified into a physical treatment method such as an evaporation method, a reverse osmosis (RO) method, and the like and an electrochemical treatment method such as a capacitive deionization (CDI) method and electrodialysis. Also, in addition to using the desalination methods as a single process in a process, there is a hybrid desalination technology formed by combining a physical process and an electrochemical treatment method.

The evaporation method has advantages of a simple principle and apparatus and obtaining high-purity fresh water but a high energy cost is necessary. In the RO method, salt water is desalinated by using a principle of obtaining pure water from a solution when a pressure higher than osmotic pressure is applied. However, in the case of an RO desalination apparatus, generally, it is necessary to apply a higher pressure than osmotic pressure of salt water by using a high-pressure pump to desalinate the salt water. Accordingly, due to high power consumption of the high-pressure pump, energy costs are high. Also, since a pretreatment for protecting a reverse osmotic membrane which is very vulnerable to turbidity components and organic matter in water is very difficult, and a recovery rate of produced fresh water in comparison to raw water which flows into the apparatus is very low, fresh water production costs are actually high, so far.

Currently, the CDI among electrochemical treatment methods has been evaluated as a low energy-consuming desalination method. However, the CDI is applied on a small scale and is not yet commercialized on a large scale. Large scale commercialization thereof has been delayed because high capacity, flow paths, treated water quality, and the like thereof are unsatisfactory and the technology has not yet been developed to be adequate for treating high concentrations of salt water.

To overcome the above problems in a single process, a variety of hybrid desalination processes in which the evaporation method and the RO method are combined or the RO method and CDI method are combined have been developed. However, so far, there are still problems in which energy consumption is still high, high pretreatment costs are necessary, and a recovery rate is low.

The prior art related to the present invention is disclosed in Korean Patent Publication No. 10-1448017 (Oct. 8, 2014, titled Forward Osmosis Membranes and Method of Preparing the Same).

DISCLOSURE OF INVENTION

Technical Problem

It is an aspect of the present invention to provide a desalination apparatus which has an energy consumption amount less than that of an existing desalination apparatus, is economic, and has an excellent fresh water production recovery rate.

It is another aspect of the present invention to provide a desalination apparatus which provides an excellent effect of reducing a pretreatment cost.

It is still another aspect of the present invention to provide a desalination apparatus capable of easily producing fresh water with a desired quality.

It is yet another aspect of the present invention to provide a desalination apparatus capable of producing fresh water even in a small facility.

It is yet another aspect of the present invention to provide a desalination apparatus capable of producing fresh water in various concentrations in a miniaturized facility.

It is a further aspect of the present invention to provide a desalination method using the desalination apparatus.

Technical Solution

One aspect of the present invention relates to a desalination apparatus. According to one embodiment, the desalination apparatus includes a forward osmosis unit which includes a draw solution part into which sea water flows and a raw water part into which raw water flows, with an osmosis membrane formed between the draw solution part and the raw water part to generate each of first treated water and first concentrated water, an electrosorptive desalination unit connected to the draw solution part through a first inflow path and into which the first treated water of the draw solution part flows to generate second treated water, and an electrodialysis unit connected to the raw water part through a second inflow path and into which the first concentrated water of the raw water part flows to generate third treated water.

According to one embodiment, the sea water may be pretreated by a first pretreatment unit and flow into the draw solution part, and the raw water may be pretreated by a second pretreatment unit and flow into the raw water part.

According to one embodiment, in the forward osmosis unit, fresh water in the raw water may pass through the osmosis membrane such that the sea water of the draw solution part may be diluted with the fresh water to generate the first treated water and the raw water of the raw water part may be concentrated to generate the first concentrated water.

According to one embodiment, the electrosorptive desalination unit may discharge second concentrated water, and the second concentrated water may flow into the electrodialysis unit through a first outlet.

According to one embodiment, the desalination apparatus may further include a storage which includes a third inflow path into which the second treated water flows and a second outlet which discharges the second treated water and where the second treated water flows into and is stored in, a power supply which is electrically connected to the electrosorptive desalination unit and the electrodialysis unit and applies power thereto, a first measuring part and a second measuring part respectively provided at the third inflow path and the second inflow path to measure a total dissolved solids (TDS) concentration, and a controller which is electrically connected to and controls the first measuring part, the second measuring part, and the power supply and stores TDS concentration values obtained from the first measuring part and the second measuring part. Here, the electrodialysis unit may discharge third concentrated water through a third outlet. Also, the third treated water may flow into the storage through a fourth inflow path, and the fourth inflow path and the third outlet may include a third measuring part and a fourth measurement part. The third inflow path and the third outlet may include a first flow path changing part and a second flow path changing part, respectively. Here, the third measuring part, the fourth measuring part, the first flow path changing part, and the second flow path changing part may be electrically connected to and controlled by the controller.

According to one embodiment, when a TDS concentration value measured by the first measuring part exceeds about 500 ppm, the controller may control the first flow path changing part so as to allow the second treated water to flow into the electrodialysis unit.

According to one embodiment, a ratio of flow rates of the sea water and the raw water, which flow into the forward osmosis unit, may be about 1:1 to about 1:5.

According to one embodiment, a voltage of about 0.2 V to about 2 V may be applied to the electrosorptive desalination unit.

According to one embodiment, a voltage of about 2 V to about 24 V may be applied to the electrodialysis unit.

Another aspect of the present invention relates to a desalination method using the desalination apparatus. According to one embodiment, the desalination method includes generating first treated water and first concentrated water by supplying pretreated sea water and pretreated raw water to a forward osmosis unit and generating second treated water by allowing the first treated water to flow into an electrosorptive desalination unit and generating third treated water by allowing the first concentrated water to flow into an electrodialysis unit.

According to one embodiment, when a TDS concentration value measured by the first measuring part exceeds about 500 ppm, the controller may control the first flow path changing part so as to allow the second treated water to flow into the electrodialysis unit.

According to one embodiment, a ratio of flow rates of the sea water and the raw water, which flow into the forward osmosis unit, may be about 1:1 to about 1:5.

According to one embodiment, a voltage of about 0.2 V to about 2 V may be applied to the electrosorptive desalination unit.

According to one embodiment, a voltage of about 2 V to about 24 V may be applied to the electrodialysis unit.

Advantageous Effects

When a desalination apparatus according to an embodiment of the present invention is used, there are provided a fresh water production recovery rate and a pretreatment cost reducing effect which are more excellent than those of an existing desalination apparatus and it is possible to produce fresh water even in a small facility, to produce fresh water in various desired concentrations, and to sharply decrease energy consumption for producing fresh water.

BRIEF DESCRIPTION OF DRAWINGS

FIG. 1 illustrates a desalination apparatus according to one embodiment of the present invention.

BEST MODE FOR INVENTION

In the description of the present invention, certain detailed explanations of well-known technologies or components of the related art will be omitted when it is deemed that they may unnecessarily obscure the essence of the present invention.

Also, since the terms which will be described below are terms defined in consideration of functions in the present invention and may vary according to intentions, practices, or the like of a user and an operator, definitions thereof may be determined on the basis of contents throughout the specification for describing the present invention.

Desalination Apparatus

One aspect of the present invention relates to a desalination apparatus. FIG. 1 illustrates a desalination apparatus 1000 according to one embodiment of the present invention. According to one embodiment, the desalination apparatus 1000 includes a forward osmosis unit 110 which includes a draw solution part 111 into which sea water flows and a raw water part 112 into which raw water flows with an osmosis membrane 113 formed between the draw solution part 111 and the raw water part 112 to generate first treated water and first concentrated water respectively, an electrosorptive desalination unit 120 connected to the draw solution part 111 through a first inflow path 14 and into which the first treated water of the draw solution part 111 flows to generate second treated water, and an electrodialysis unit 160 connected to the raw water part 112 through a second inflow path 15 and into which the first concentrated water of the raw water part 112 flows to generate third treated water.

Pretreatment Unit

According to one embodiment, the sea water may be pretreated through a first pretreatment unit 101 and flow into the draw solution part 111, and the raw water may be pretreated through a second pretreatment unit 102 and flow into the raw water part 112.

Sea water flows into a sea water inflow part 10. The sea water has salt concentrations higher than salt concentrations of the raw water and functions as a draw solution when being forward-osmotically infiltrated in the forward osmosis unit 110 which will be described below.

Raw water flows into a raw water inflow part 11. In the present invention, treated sewage water, treated waste water, rainwater, underground water, or the like may be used as the raw water.

The first pretreatment unit 101 and the second pretreatment unit 102 remove particulates and organic matter of the raw water and sea water which flow in, to generate second feed water and first feed water, respectively. The first pretreatment unit 101 and the second pretreatment unit 102 are included to prevent the forward osmosis unit 110 which will be described below from being damaged and to reduce forward osmosis filtration time and energy when the pretreatment is performed as described above.

The first pretreatment unit 101 and the second pretreatment unit 102 may include ordinary components. For example, the first pretreatment unit 101 and the second pretreatment unit 102 may include a sand filter, a layered filter, a micro filter, a backflow micro filter, a precipitation tank, an aerator and the like but are not limited thereto. Since it is possible to easily remove particulates and organic matter included in the sea water and the raw water when the above-described pretreatment unit is used, the time and energy used for forward osmosis filtration may be reduced.

According to one embodiment, each of a first supply part 12 and a second supply part 13 may include a measuring part (not shown) capable of measuring a total dissolved solids (TDS) concentration value to measure TDS concentrations of the pretreated sea water and the pretreated raw water.

Referring to FIG. 1, the sea water may flow into the draw solution part 111 through the first supply part 12 and the raw water may flow into the raw water part 112 through the second supply part 13. The first supply part 12 and the second supply part 13 may include a first flow rate adjusting means 401 and a second flow rate adjusting means 402 for adjusting flow rates of the sea water and the raw water.

Forward Osmosis Unit

Referring to FIG. 1, according to one embodiment, fresh water in raw water of the forward osmosis unit 110 passes through the osmosis membrane 113 such that sea water of the draw solution part 111 may be diluted with the fresh water to generate first treated water and the raw water of the raw water part 112 may be concentrated to generate first concentrated water. When forward osmosis filtration is performed as described above, a fresh water recovery rate of the present invention may be further increased and the time necessary for generating fresh water may be reduced.

According to one embodiment, a flow rate of raw water which flows into the forward osmosis unit 110 may be higher than a flow rate of sea water. According to one embodiment, the sea water and the raw water may flow with a flow rate ratio of about 1:1 to about 1:5 into the forward osmosis unit 110. According to the above flow rate ratio range, since there is provided excellent forward osmosis filtration efficiency in the forward osmosis unit 110, a fresh water recovery rate of the present invention may be further increased and the time necessary for generating fresh water may be reduced. According to one embodiment, a controller 150 may control flow rates of the sea water and raw water which flow into the forward osmosis unit 110 by controlling the first flow rate adjusting means 401 and the second flow rate adjusting means 402.

Electrosorptive Desalination Unit

The electrosorptive desalination unit 120 is included to generate second treated water by reducing a TDS concentration included in the first treated water. According to one embodiment, the electrosorptive desalination unit 120 is connected to the draw solution part 111 through the first inflow path 14 such that first treated water of the draw solution part 111 flows thereinto to generate the second treated water.

The electrosorptive desalination unit 120 may be a general one. For example, the electrosorptive desalination unit 120 may be a capacitive deionization (CDI) apparatus using an ion exchange membrane and an activated carbon electrode but is not limited thereto. The CDI apparatus may be operated with a voltage and energy consumption lower than those of other desalination apparatuses.

According to one embodiment, a voltage of about 0.2 V to about 2 V may be applied to the electrosorptive desalination unit 120. Within the above range, the second treated water may be quickly generated by easily reducing the TDS of the first treated water with less power consumption.

According to one embodiment, the electrosorptive desalination unit 120 may discharge second concentrated water. Referring to FIG. 1, the second concentrated water may flow into the second inflow path 15 and then the electrodialysis unit 160 through a first outlet 17.

Referring to FIG. 1, according to one embodiment of the present invention, the desalination apparatus 1000 further includes a storage 130 which includes a third inflow path 16 into which the second treated water flows and a second outlet 19 which discharges the stored second treated water and where the second treated water flows into, is stored in, and is discharged from, a power supply 140 electrically connected to the electrosorptive desalination unit 120 and the electrodialysis unit 160 to apply power thereto, first and second measuring parts 201 and 202 provided at the third inflow path 16 and the second inflow path 15 to measure TDS, and the controller 150 which is electrically connected to the first measuring part 201, the second measuring part 202, and the power supply 140 to control them and stores TDS concentration values obtained by the first measuring part 201 and the second measuring part 202. The electrodialysis unit 160 discharges third concentrated water. The third concentrated water is discharged to the outside through a third outlet 20. The third treated water flows into the storage 130 through a fourth inflow path 18. The third inflow path 16 and the third outlet 20 include a first flow path changing part 301 and a second flow path changing part 302, respectively. The first flow rate adjusting means 401, the second flow rate adjusting means 402, and a third flow rate adjusting means 403, which adjust flow rates, are provided at the first supply part 12, the second supply part 13, and the second inflow path 15, respectively. The first flow path changing part 301, the second flow path changing part 302, and the first to third flow rate adjusting means 401, 402, and 403 may be electrically connected to and controlled by the controller 150.

Electrodialysis Unit

The electrodialysis unit 160 may be a general one. For example, the electrodialysis unit 160 includes pluralities of positive ion exchange membranes and negative ion exchange membranes alternately provided between a positive electrode and a negative electrode.

The electrodialysis unit 160 is connected to the raw water part 112 through the second inflow path 15, and the first concentrated water of the raw water part 112 flows thereinto and the third treated water is generated. According to one embodiment, as the power supply 140 supplies direct current (DC) power to both ends of the electrodialysis unit 160, the first concentrated water which flows thereinto is allowed to pass with a certain pressure and negative ions and positive ions included in the first concentrated water are filtrated and separated to generate the third treated water and the third concentrated water. According to one embodiment, the DC power of about 2 V to about 24 V may be applied. Also, an applied current density value may be about 1 $A/m^2$ to about 100 $A/m^2$. Under these conditions, excellent electrodialysis process efficiency may be provided.

Within the above range, the third treated water may be quickly generated by easily reducing the TDS of the first concentrated water and the second concentrated water with less power consumption.

According to one embodiment, the power supply 140 may variably apply power to the electrosorptive desalination unit 120 and the electrodialysis unit 160.

According to one embodiment, the electrodialysis unit 160 may discharge the third concentrated water through the third outlet 20 and the third treated water may flow into the storage 130 through the fourth inflow path 18.

Referring to FIG. 1, the controller 150 may control the third flow rate adjusting means 403 to allow the third concentrated water to flow again into the second inflow path 15 to adjust a flow rate. When the third concentrated water flows again thereinto as described above, operation efficiency of the electrodialysis unit 160 is excellent such that fresh water production efficiency may be excellent.

Also, although not shown in FIG. 1, the electrodialysis unit 160 includes a treatment part and a concentration part. Here, the second inflow path 15 is diverged into a fifth inflow path connected to the treatment part and a sixth inflow path connected to the concentration part such that the second treated water may flow into the concentration part and the treatment part. The treatment part may be connected to the fourth inflow path 18 so as to discharge the third treated water, and the concentration part may be connected to the third outlet 20 so as to discharge the third concentrated water.

According to one embodiment, the controller 150 may control the third flow rate adjusting means 403 to allow the third concentrated water to flow into the sixth inflow path and the concentration part of the electrodialysis unit 160. In the above inflow, operation efficiency and fresh water production efficiency of the electrodialysis unit 160 may be excellent.

According to one embodiment, the second treated water may flow with a flow rate ratio of about 1:0.5 to about 1:5 into the concentration part and the treatment part, respectively. In the case of inflow within this range of the flow rate ratio, operation efficiency and fresh water production efficiency may be excellent.

According to one embodiment, the first flow rate adjusting means 401, the second flow rate adjusting means 402, and third flow rate adjusting means 403, which adjust flow rates, may be provided at the first supply part 12, the second supply part 13, and the second inflow path 15, respectively. According to one embodiment, the first to third flow rate adjusting means 401, 402, and 403 may be general flow rate control valves and are electrically connected to and controlled by the controller 150.

When the third inflow path 16 and the second inflow path 15 respectively include the first measuring part 201 and the second measuring part 202, it is possible to easily adjust necessary water quality conditions of treated water and to quickly respond even in a situation in which water quality to needs to be urgently controlled.

According to one embodiment, the third inflow path 16 and the second inflow path 15 include the first flow path changing part 301 and the second flow path changing part 302, respectively. The first flow path changing part 301 and the second flow path changing part 302 may be general flow path change valves. According to one embodiment, the first measuring part 201, the second measuring part 202, the first flow path changing part 301, and the second flow path changing part 302 may be electrically connected to and controlled by the controller 150.

Also, according to one embodiment, the controller 150 may variably control flow rates of sea water, raw water, first concentrated water, and second concentrated water, which flow into the forward osmosis unit 110 and the electrodialysis unit 160 by controlling the first to third flow rate adjusting means 401, 402, and 403 by using TDS concentration values measured by the first to fourth measuring parts 201, 202, 203, and 204 to satisfy a TDS concentration value of treated water.

Referring to FIG. 1, according to one embodiment of the present invention, when a TDS concentration value of the second treated water, measured by the first measuring part 201, exceeds 500 ppm, the controller 150 may control the first flow path changing part 301 to allow the second treated water to flow into the second inflow path 15 and the electrodialysis unit 160. When the second treated water flows into the electrodialysis unit 160 as described above, efficiency of preparing fresh water may be excellent. For example, it is possible to control a TDS concentration value to be more than about 500 ppm and to be about 5,000 ppm or less. For example, it is possible to control a TDS concentration value to be about 500.1 ppm to about 3,500 ppm.

According to one embodiment of the present invention, a third measuring part (not shown) and a fourth measuring part (not shown) are respectively provided at the second outlet 19 and the fourth inflow path 18 to measure TDS concentration values. The measured TDS concentration values may be transferred to and stored in the controller 150 electrically connected to the third measuring part and the fourth measuring part.

When the desalination apparatus according to one embodiment of the present invention is applied, since it is possible to adjust operation conditions of each unit to be optimum in real time according to water quality conditions of inflow water and water quality conditions required for produced fresh water in comparison to an existing desalination process, energy consumption for producing fresh water may be reduced, a recovery rate may be increased, and costs for producing fresh water may be minimized such as a raw water pretreatment cost reduction and the like.

Desalination Method Using Desalination Apparatus

Another aspect of the present invention relates to a desalination method using the desalination apparatus. The desalination method includes generating first treated water and generating second treated water and third treated water. In more detail, the desalination method includes generating first treated water and first concentrated water by supplying pretreated sea water and pretreated raw water to the forward osmosis unit and generating second treated water by allowing the first treated water to flow into the electrosorptive desalination unit and generating third treated water by allowing the first concentrated water to flow into the electrodialysis unit.

Generating of First Treated Water

In the operation, first treated water and first concentrated water are generated by supplying pretreated sea water and pretreated raw water to the forward osmosis unit.

According to one embodiment, sea water and raw water may be supplied from the sea water inflow part and the raw water inflow part to the first pretreatment unit and the second pretreatment unit, respectively and particulates and organic matter of the sea water and the raw water may be removed to generate pretreated sea water and pretreated raw water. When the sea water and the raw water are pretreated, it is possible to prevent the forward osmosis unit and the electrosorptive desalination unit from being damaged, to reduce energy consumed for generating treated water, and to reduce the time for generating treated water.

According to one embodiment, the pretreated sea water flows into the draw solution part of the forward osmosis unit, the pretreated raw water flow into the raw water part, and an osmosis membrane is formed between the draw solution part and the raw water part such that first treated water and first concentrated water are generated.

According to one embodiment, a flow rate of raw water which flows into the forward osmosis unit may be higher than a flow rate of sea water. According to one embodiment, the sea water and the raw water may flow with a flow rate ratio of about 1:1 to about 1:5 into the forward osmosis unit. In the case of inflow within this range of the flow rate ratio, since there is provided excellent forward osmosis filtration efficiency in the forward osmosis unit, a fresh water recovery rate of the present invention may be further increased and the time necessary for generating fresh water may be reduced. According to one embodiment, the controller may control flow rates of the sea water and the raw water, which flow thereinto, by controlling the first flow rate adjusting means and the second flow rate adjusting means.

Generating of Second Treated Water and Third Treated Water

In the operation, second treated water is generated by allowing the first treated water to flow into the electrosorptive desalination unit and third treated water is generated by allowing the first concentrated water to flow into the electrodialysis unit.

Referring to FIG. 1, according to one embodiment of the present invention, when a TDS concentration value of the second treated water, measured by the first measuring part, exceeds about 500 ppm, the controller may control the first flow path changing part to allow the second treated water to flow into the second inflow path and the electrodialysis unit. When the second treated water flows into the electrodialysis unit as described above, efficiency of preparing fresh water may be excellent. For example, it is possible to control a TDS concentration value to be more than about 500 ppm and to be about 5,000 ppm or less. For example, it is possible to control a TDS concentration value to be about 500.1 ppm to about 3,500 ppm.

Also, the controller may control a flow rate by allowing the third concentrated water to flow into the second inflow path by controlling the third flow rate adjusting means. When the third concentrated water flows again thereinto as described above, operation efficiency of the electrodialysis unit is excellent such that fresh water production efficiency may be excellent.

Also, although not shown in FIG. 1, the electrodialysis unit includes the treatment part and the concentration part. Here, the second inflow path is diverged into the fifth inflow path connected to the treatment part and the sixth inflow path connected to the concentration part such that the second treated water may flow into the concentration part and the treatment part. The treatment part may be connected to the fourth inflow path to discharge the third treated water, and the concentration part may be connected to the third outlet to discharge the third concentrated water.

According to one embodiment, the controller may control the third flow rate adjusting means to allow the third concentrated water to flow into the sixth inflow path and the concentration part of the electrodialysis unit. In the case of inflow as described above, operation efficiency and fresh water production efficiency of the electrodialysis unit may be excellent.

According to one embodiment, second treated water may flow with a flow rate ratio of about 1:0.5 to about 1:5 into the concentration part and the treatment part. In the case of inflow within this range of the flow rate ratio, operation efficiency and fresh water production efficiency may be excellent.

According to one embodiment, a voltage of about 0.2 V to about 2 V may be applied to the electrosorptive desalination unit. Within the above range, the second treated water may be quickly generated by easily reducing TDS of the first treated water with less power consumption.

According to one embodiment, DC power of about 2 V to about 24 V may be applied to the electrodialysis unit. Also, an applied current density value may be about 1 A/m$^2$ to about 100 A/m$^2$. Under these conditions, excellent electrodialysis process efficiency may be provided.

MODE OF INVENTION

Example and Comparative Example

With respect to an embodiment and a comparative example, the desalination apparatus 1000 as shown in FIG. 1 was manufactured. The first pretreatment unit 101 and the second pretreatment unit 102 used sand filters filled with filtering sand with an effective grain size of 0.4 mm. A CDI unit using an ion exchange membrane and an activated carbon electrode was used as the electrosorptive desalination unit 120.

Example

Sea water with a TDS concentration value of about 41,000 ppm and raw water with a TDS concentration value of about 12,000 ppm are filtered using the desalination apparatus.

Second feed water was generated by removing particulates and organic matter of the sea water which had flowed into the first pretreatment unit 101 through the sea water inflow part 10 and first feed water was generated by removing particulates and organic matter of the raw water which had flowed into the second pretreatment unit 102 through the raw water inflow part 11.

As shown in FIG. 1, the pretreated sea water flowed into the draw solution part 111 of the forward osmosis unit 110 through the first supply part 12 and the pretreated raw water flowed into the raw water part 112 through the second supply part 13. Here, the pretreated sea water and raw water flowed with a flow rate of 1:1 to 1:5 into the forward osmosis unit 110.

Fresh water in the raw water which had flowed thereinto passed through the osmosis membrane 113 such that the sea water of the draw solution part 111 was diluted with the fresh water to generate first treated water and the raw water of the raw water part 112 was concentrated to generate first concentrated water.

The first treated water flowed into the electrosorptive desalination unit 120 through the first inflow path 14 connected to the draw solution part 111. The controller 150 applied a voltage of 0.2 V to 2.0 V to the electrosorptive desalination unit 120 by controlling the power supply 140 and reduced a TDS concentration to generate second treated water and second concentrated water. The second concentrated water flowed into the second inflow path 15 and the electrodialysis unit 160 through the first outlet 17.

Meanwhile, the first concentrated water flowed into the electrodialysis unit 160 through the second inflow path 15 connected to the raw water part 112. The controller 150 applied DC power of 2 V to the electrodialysis unit 160 by controlling the power supply 140 and reduced a TDS concentration of the first concentrated water to generate third treated water and third concentrated water. A TDS concentration of the third treated water, measured by the fourth measuring part (not shown) provided at the fourth inflow path 18, was 350 ppm. The third treated water flowed into the fourth inflow path 18 and storage 130.

Also, the controller 150 changed a flow path of the third concentrated water to the second inflow path 15 by controlling the second flow path changing part 302 to allow the second concentrated water to flow again into the electrodialysis unit 160.

The second treated water and the third treated water, which had flowed into the storage, flowed into the second outlet 19 and were discharged to the outside. A TDS concentration measured by the third measuring part provided at the second outlet 19 was 360 ppm.

Comparative Example

Treated water was generated using the same method as that of the example except that a reverse osmosis unit was provided instead of the forward osmosis unit 110 and pretreated sea water and raw water flowed into the reverse osmosis unit.

Total energy consumption during operation of each of the desalination apparatuses of the example and comparative example was measured and a result thereof was shown in Table 1.

TABLE 1

|  | Energy consumption (Wh/L) |
| --- | --- |
| Example | 3.5 |
| Comparative Example | 6.1 |

Referring to the result of Table 1, it may be seen that energy consumption of the desalination apparatus according to the example of the present invention was remarkably lower than that of the desalination apparatus of the comparative example to which reverse osmosis filtration was applied.

It should be appreciated that simple modifications and changes of the present invention may be easily made by one of ordinary skill in the art and all the modifications and changes may be included in the scope of the present invention.

The invention claimed is:

1. A desalination apparatus comprising:
a forward osmosis unit which comprises a draw solution part into which sea water flows and a raw water part into which raw water flows, with an osmosis membrane formed between the draw solution part and the raw water part to generate each of first treated water and first concentrated water;
an electrosorptive desalination unit connected to the draw solution part through a first inflow path and into which the first treated water of the draw solution part flows to generate second treated water; and
an electrodialysis unit connected to the raw water part through a second inflow path and into which the first concentrated water of the raw water part flows to generate third treated water.

2. The desalination apparatus of claim 1, wherein the sea water is pretreated by a first pretreatment unit and flows into the draw solution part, and the raw water is pretreated by a second pretreatment unit and flows into the raw water part.

3. The desalination apparatus of claim 1, wherein in the forward osmosis unit, fresh water in the raw water passes through the osmosis membrane such that the sea water of the draw solution part is diluted with the fresh water to generate the first treated water and the raw water of the raw water part is concentrated to generate the first concentrated water.

4. The desalination apparatus of claim 1, wherein the electrosorptive desalination unit discharges second concentrated water, and the second concentrated water flows into the electrodialysis unit through a first outlet.

5. The desalination apparatus of claim 1, further comprising:
a storage, into the second treated water flows into and is stored, which is provided with a third inflow path into which the second treated water flows and a second outlet which discharges the second treated water;
a power supply which is electrically connected to the electrosorptive desalination unit and the electrodialysis unit and applies power thereto;
a first measuring part and a second measuring part respectively provided at the third inflow path and the second inflow path to measure a total dissolved solids (TDS) concentration; and
a controller which is electrically connected to and controls the first measuring part, the second measuring part, and the power supply and stores TDS concentration values obtained from the first measuring part and the second measuring part,
wherein the electrodialysis unit discharges third concentrated water, and the third concentrated water is discharged through a third outlet,
wherein the third treated water flows into the storage through a fourth inflow path,
wherein the third inflow path and the third outlet are provided with a first flow path changing part and a second flow path changing part, respectively,
wherein a first supply part, a second supply part, and the second inflow path are provided with a first flow rate adjusting means, a second flow rate adjusting means, and a third flow rate adjusting means, respectively, and
wherein the first flow path changing part, the second flow path changing part, and the first to third flow rate adjusting means are electrically connected to and controlled by the controller.

6. The desalination apparatus of claim 5, wherein when a TDS concentration value measured by the first measuring part exceeds about 500 ppm, the controller controls the first flow path changing part so as to allow the second treated water to flow into the electrodialysis unit.

7. The desalination apparatus of claim 1, wherein a ratio of flow rates of the sea water and the raw water, which flow into the forward osmosis unit, are about 1:1 to about 1:5.

8. The desalination apparatus of claim 5, wherein a voltage of about 0.2 V to about 2 V is applied to the electrosorptive desalination unit.

9. The desalination apparatus of claim 5, wherein a voltage of about 2 V to about 24 V is applied to the electrodialysis unit.

10. A desalination method comprising:
generating first treated water and first concentrated water by supplying pretreated sea water and pretreated raw water to a forward osmosis unit; and
generating second treated water by allowing the first treated water to flow into an electrosorptive desalination unit and generating third treated water by allowing the first concentrated water to flow into an electrodialysis unit.

11. The desalination method of claim 10, wherein when a TDS concentration value measured by a first measuring part exceeds about 500 ppm, a controller controls a first flow path changing part so as to allow the second treated water to flow into the electrodialysis unit.

12. The desalination method of claim 10, wherein a ratio of flow rates of the sea water and the raw water, which flow into the forward osmosis unit, are about 1:1 to about 1:5.

13. The desalination method of claim 10, wherein a voltage of about 0.2 V to about 2 V is applied to the electrosorptive desalination unit.

14. The desalination method of claim 10, wherein a voltage of about 2V to about 24V is applied to the electrodialysis unit.

* * * * *